(12) United States Patent
Briggs

(10) Patent No.: US 6,887,081 B1
(45) Date of Patent: May 3, 2005

(54) BIBLE TEACHING AID

(76) Inventor: Lyndell W. Briggs, 900 Oak Leaf La., Louisville, KY (US) 40219

( * ) Notice: Subject to any disclaimer, the term of this patent is extended or adjusted under 35 U.S.C. 154(b) by 64 days.

(21) Appl. No.: 10/121,349

(22) Filed: Apr. 12, 2002

(51) Int. Cl.[7] ............................. G09B 19/00; A63B 7/00
(52) U.S. Cl. ................... 434/245; 273/141 A; D21/374
(58) Field of Search ............................... 434/245, 154; 273/141 R, 141 A; 446/236, 254; D21/374

(56) References Cited

U.S. PATENT DOCUMENTS

| 633,077 A | * | 9/1899 | Crandall | .................. 273/141 R |
| 4,807,878 A | * | 2/1989 | Tripp | .......................... 273/431 |
| 5,855,483 A | * | 1/1999 | Collins et al. | .............. 434/322 |

FOREIGN PATENT DOCUMENTS

CA 2315448 * 1/2002 ............. A63F/5/00

* cited by examiner

Primary Examiner—John Edmund Rovnak

(57) ABSTRACT

A bible teaching aid that includes a voice generating circuit, a large number of circuit recognizable templates positionable on a housing containing the voice generating circuit, a spinning pointer mechanism that stops randomly at one of a preset number of stop locations, and generates a spoken biblical teaching message stored in one of a large number of keyed memory locations of the voice generating circuit that are keyed to specific stop locations on specific sides of specific templates that corresponds with a biblical figure, event or location depicted at that stop spot on that particular side of that particular template.

1 Claim, 11 Drawing Sheets

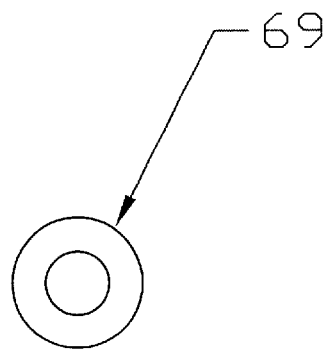
TOP VIEW
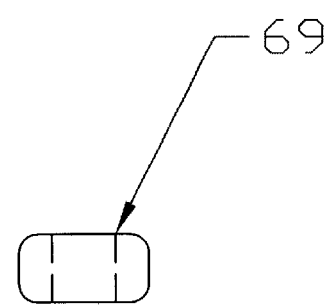
SIDE VIEW
FIGURE 5A
FIGURE 5B

BIBLE TEACHING AID

TECHNICAL FIELD

The present invention relates to teaching aids that include an audible output corresponding to the picture pointed to by a moving pointer mechanism and more particularly to a bible teaching aid for teaching about various figures, events and locations in the bible and that includes a housing containing a battery powered, voice generating microprocessor controlled circuit, and has a motor driven pointer on the exterior thereof that randomly stops at one of a preset number of stop points, and a large number of coded templates each having a front and back surface provided with a figure, event or location from the Bible depicted at each of the preset stop points and a template insertion key extending from each of the front and the back surfaces that is inserted into a template key receiving socket of the voice generating microprocessor controlled circuit and which has a specific code hard wired within the key such that the voice generating microprocessor controlled circuit knows which template is positioned on the housing face and which side of the template is facing the user; the voice generating microprocessor controlled circuit having a particular voice message for each stop location for each front and back surface of each template is stored in memory on the voice generating microprocessor controlled circuit such that a correct spoken message is played describing the particular figure, event or location from the Bible that is pointed to by the pointer end of the motor driven pointer at the end of a rotating period started by depressing the start pointer button; the voice generating microprocessor controlled circuit generating the specific voice message signal to a speaker which outputs the spoken message to the user detailing who, what or where is being pointed to and provides some biblical teaching to aid the user in remembering the particular biblical figure, event or location being pointed to.

BACKGROUND ART

Many individuals believe it is important to begin teaching children at an early age about the figures, events and locations described in the Bible. It would be desirable for these individuals to have a teaching aid that functioned much like a toy but which gave a short bible lesson and identified a pointed to figure, event or location of the bible printed on one side of either side of a large number of keyed templates that were recognizable by a microprocessor controlled voice generating circuit contained within the teaching aid.

GENERAL SUMMARY DISCUSSION OF INVENTION

It is thus an object of the invention to provide a bible figure, event and location teaching aid that includes a housing containing a battery powered, voice generating microprocessor controlled circuit, and has a motor driven pointer on the exterior thereof that randomly stops at one of a preset number of stop points, and a large number of coded templates each having a front and back surface provided with a figure, event or location from the Bible depicted at each of the preset stop points and a template insertion key extending from each of the front and the back surfaces that is inserted into a template key receiving socket of the voice generating microprocessor controlled circuit and which has a specific code hard wired within the key such that the voice generating microprocessor controlled circuit knows which template is positioned on the housing face and which side of the template is facing the user; the voice generating microprocessor controlled circuit having a particular voice message for each stop location for each front and back surface of each template is stored in memory on the voice generating microprocessor controlled circuit such that a correct spoken message is played describing the particular figure, event or location from the Bible that is pointed to by the pointer end of the motor driven pointer at the end of a rotating period started by depressing the start pointer button; the voice generating microprocessor controlled circuit generating the specific voice message signal to a speaker which outputs the spoken message to the user detailing who, what or where is being pointed to and provides some biblical teaching to aid the user in remembering the particular biblical figure, event or location being pointed to by the pointer end of the spinning pointer.

Accordingly, a bible figure, event, and location teaching aid is provided. The bible figure, event, and location teaching aid includes a housing containing a battery powered, voice generating microprocessor controlled circuit, and has a motor driven pointer on the exterior thereof that randomly stops at one of a preset number of stop points, and a large number of coded templates each having a front and back surface provided with a figure, event or location from the Bible depicted at each of the preset stop points and a template insertion key extending from each of the front and the back surfaces that is inserted into a template key receiving socket of the voice generating microprocessor controlled circuit and which has a specific code hard wired within the key such that the voice generating microprocessor controlled circuit knows which template is positioned on the housing face and which side of the template is facing the user; the voice generating microprocessor controlled circuit having a particular voice message for each stop location for each front and back surface of each template is stored in memory on the voice generating microprocessor controlled circuit such that a correct spoken message is played describing the particular figure, event or location from the Bible that is pointed to by the pointer end of the motor driven pointer at the end of a rotating period started by depressing the start pointer button; the voice generating microprocessor controlled circuit generating the specific voice message signal to a speaker which outputs the spoken message to the user detailing who, what or where is being pointed to and provides some biblical teaching to aid the user in remembering the particular biblical figure, event or location being pointed to by the pointer end of the spinning pointer.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

Exemplary Mode for Carrying Out the Invention

Figure 1:
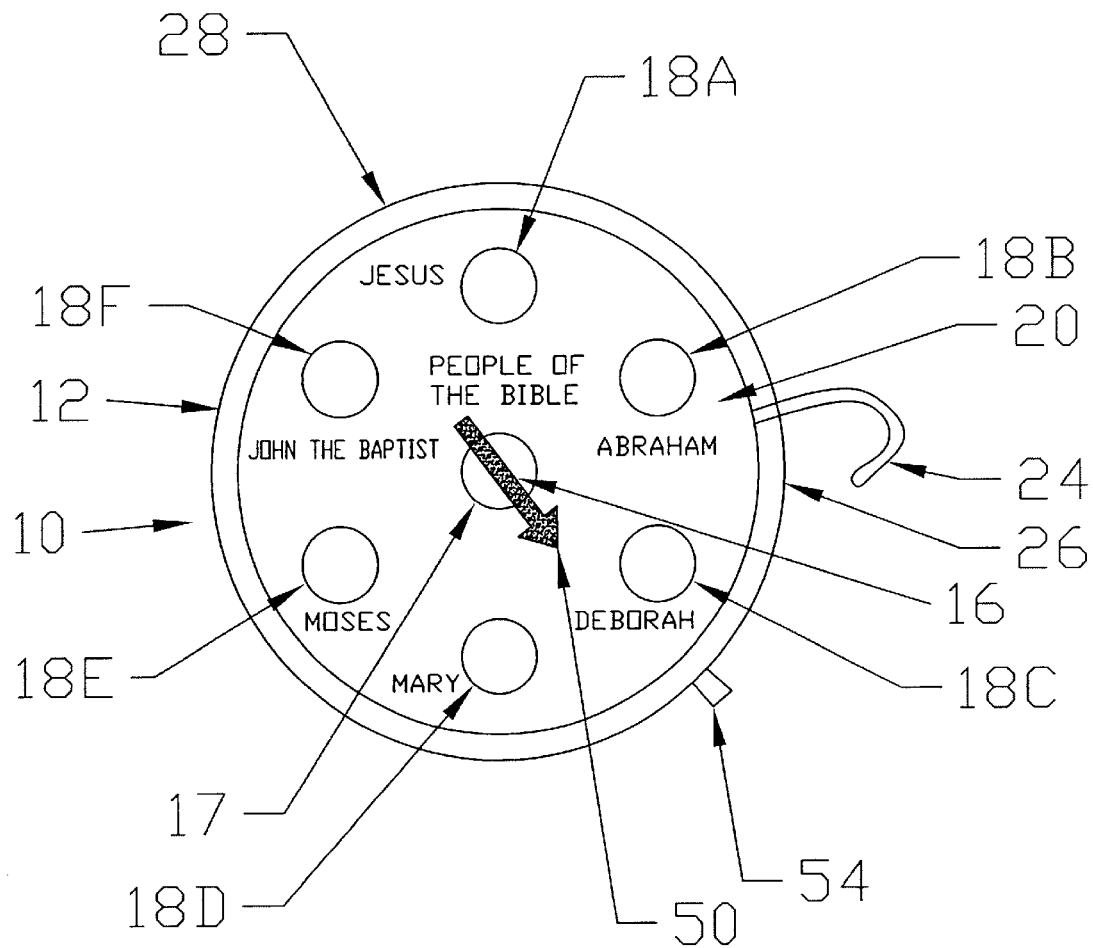
FIG. 1 is a front plan view of an exemplary embodiment of the bible teaching aid of the present invention.
Figure 2:
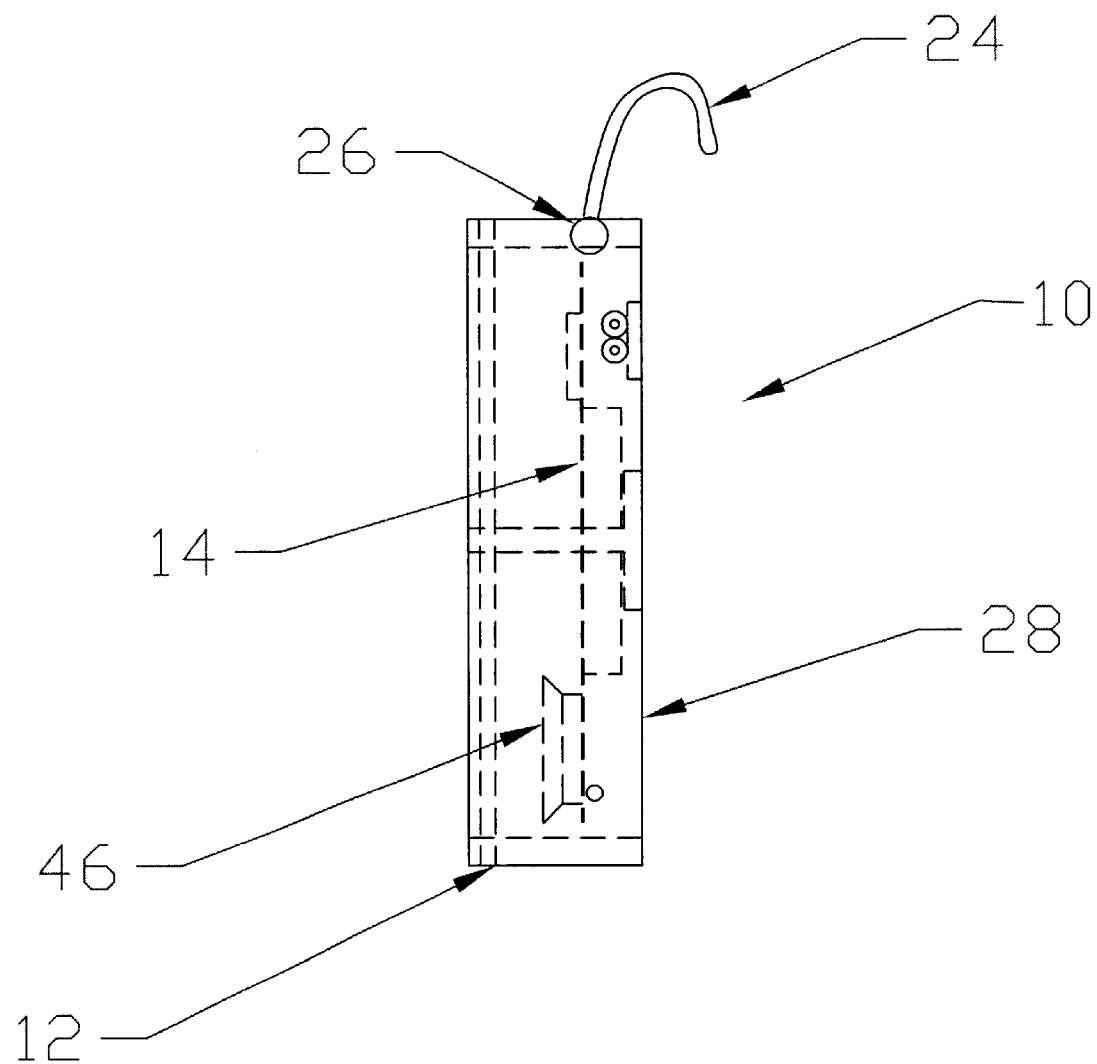
FIG. 2 is a side cut-away view of the bible teaching aid of FIG. 1.
Figure 3:
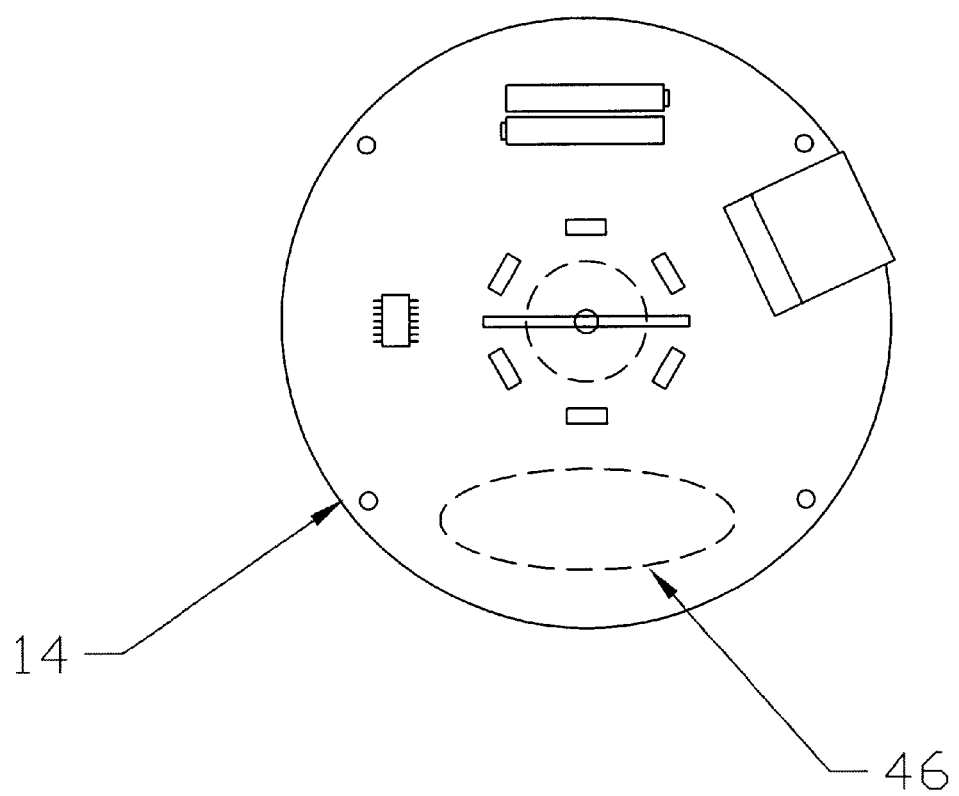
FIG. 3 is a front plan view of an exemplary voice generating, microprocessor controlled circuit of the bible teaching aid of FIG. 1 removed from the housing and in isolation.
Figure 4:
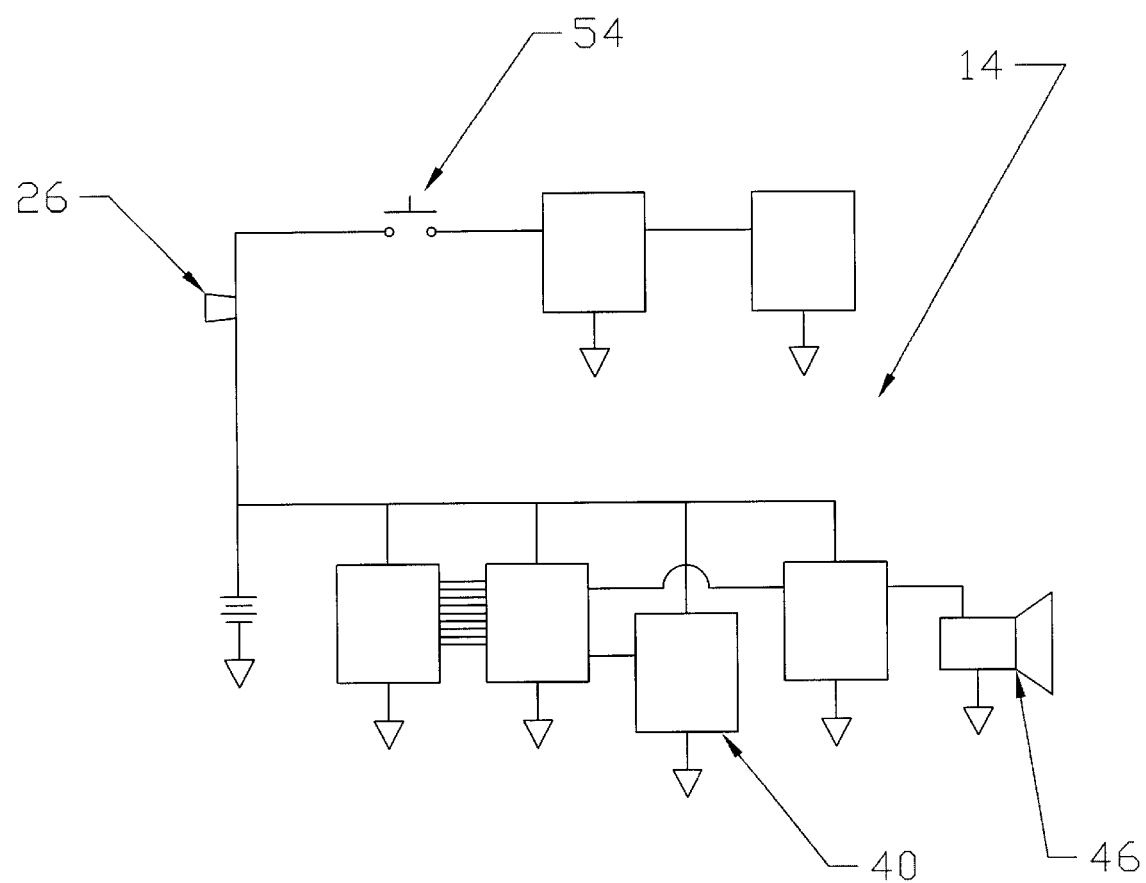
FIG. 4 is a schematic diagram of the exemplary voice generating, microprocessor controlled circuit of FIG. 3.
Figure 5:
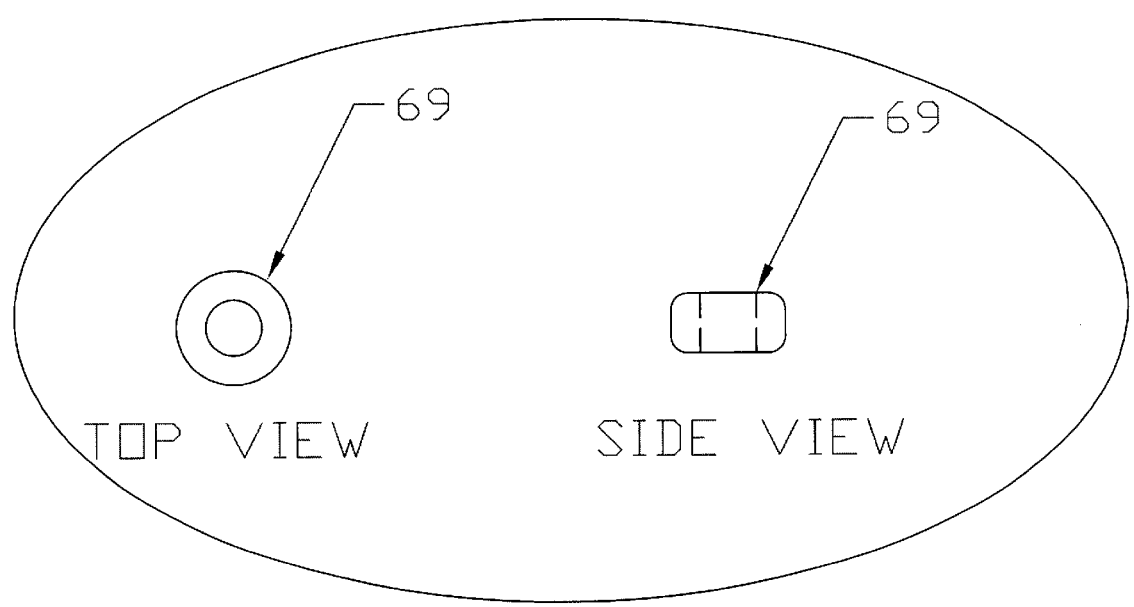
FIG. 5 is a top and a side view of a nut used to attach the pointer arrow to the motor driven spinner shaft.
Figure 6:
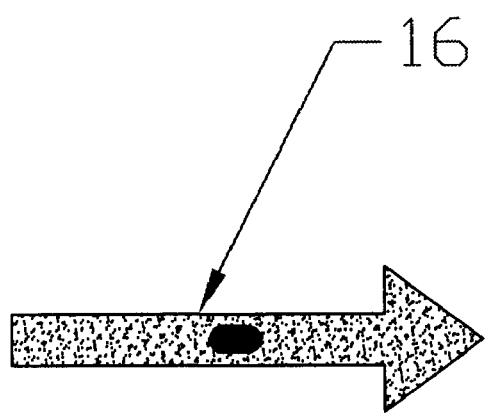
FIG. 6 is a top plan view of the pointer arrow in isolation.
Figure 7:
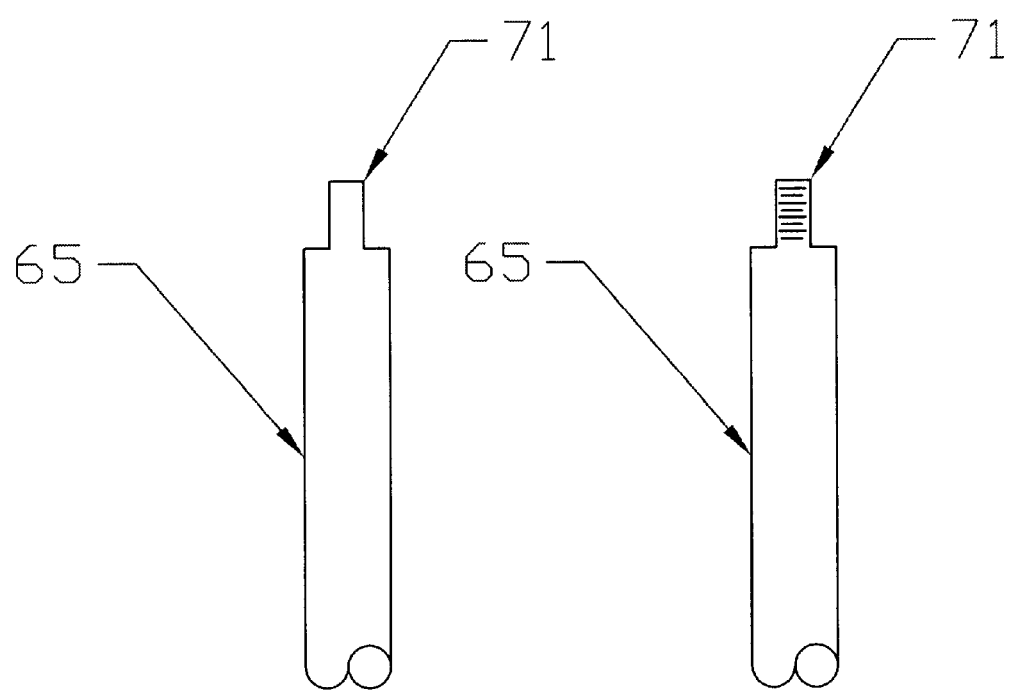
FIG. 7 shows a front and a side view of the motor driven spinner shaft in isolation.
Figure 7A:
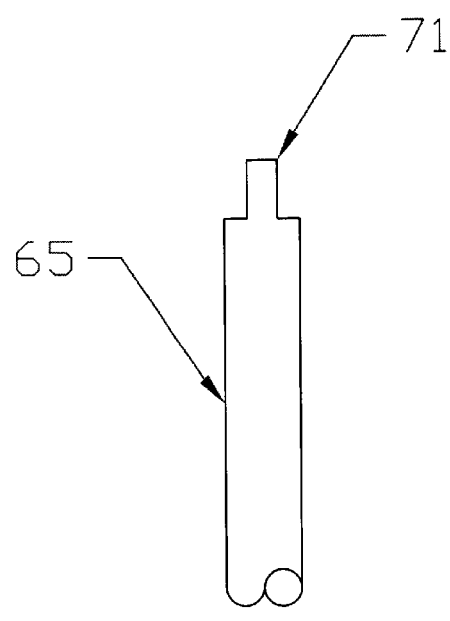
Figure 7B:
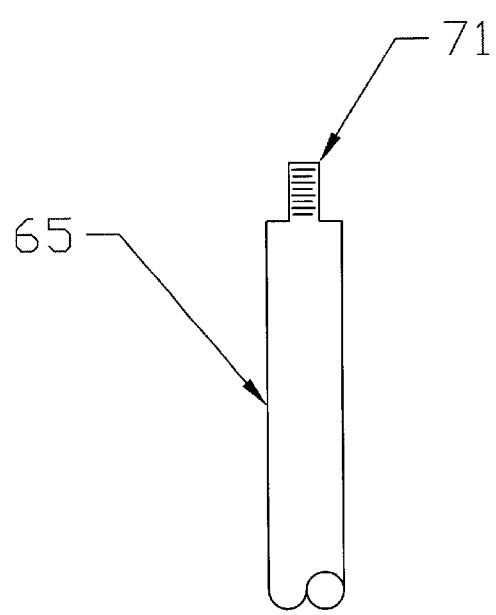
Figure 8:
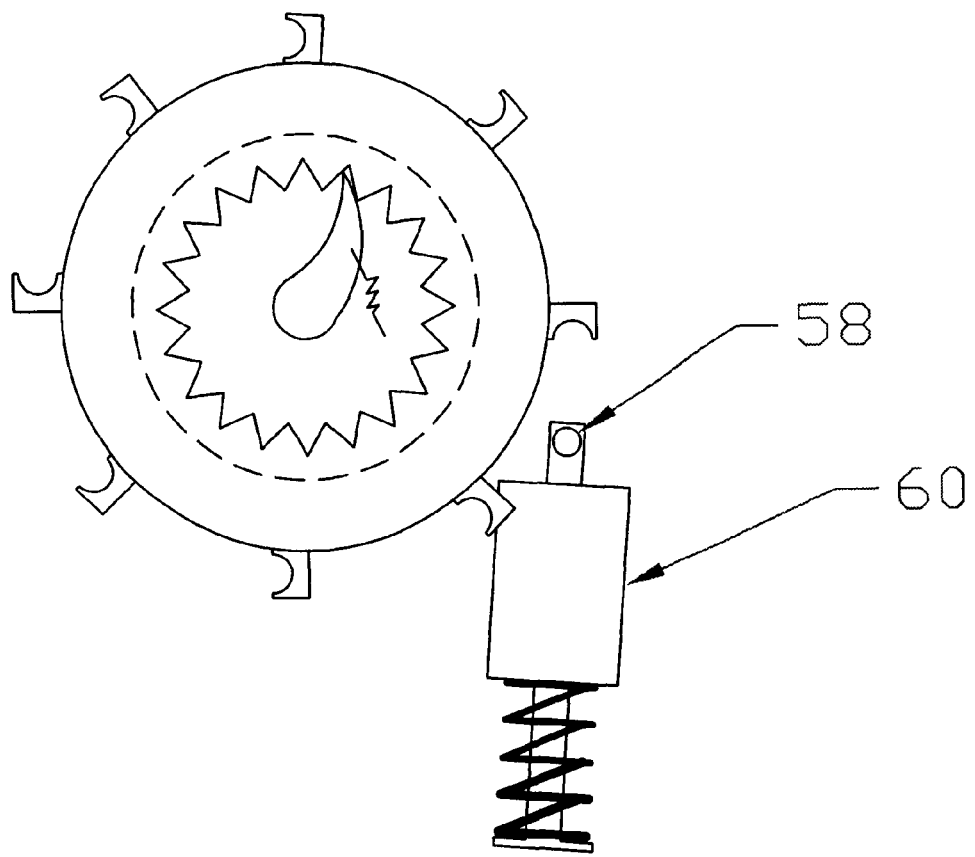
FIG. 8 is a top plan view of the shaft stop mechanism that stops the spinner at one of the preset stop points with the stop actuator withdrawn to allow the spinner to spin.
Figure 9:
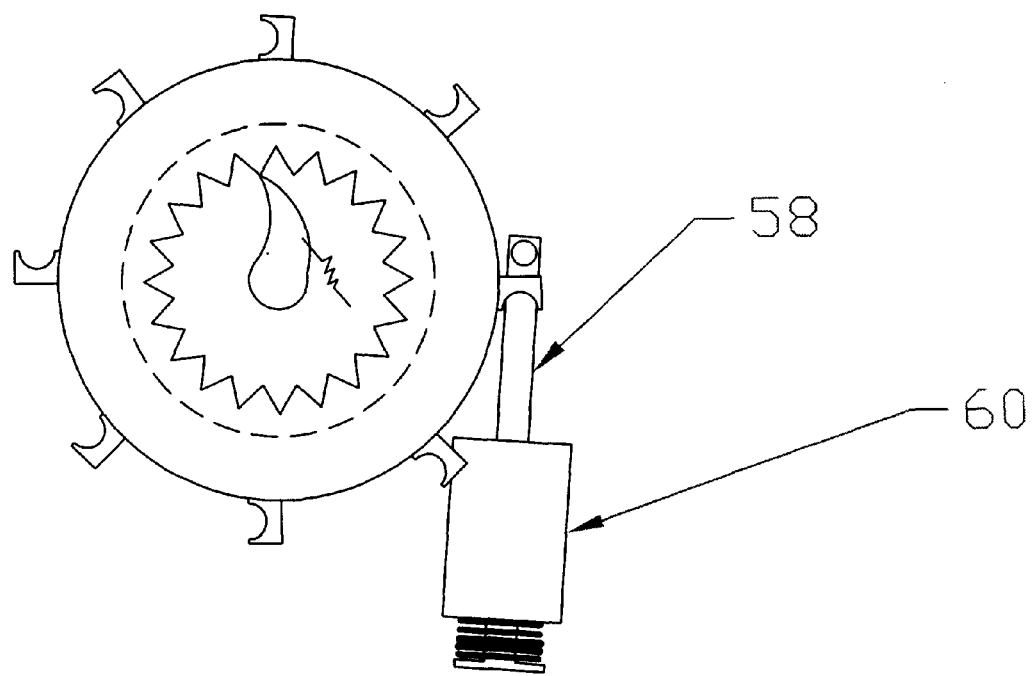
FIG. 9 is a top plan view of the shaft stop mechanism that stops the spinner at one of the preset stop points with the stop actuator extended to stop the spinner at a particular preset stop point.

FIGS. 1–9 show various aspects of an exemplary embodiment of the bible figure, event and location teaching aid of the present invention generally designated 10. Bible teaching aid 10 includes a housing 12 containing a battery powered, voice generating microprocessor controlled circuit 14, and has a motor driven pointer 16 on the exterior thereof that randomly stops at one of a preset number of stop points 18a–f, and a large number of coded templates 20 each having a front and back surface provided with a figure, event or location from the Bible depicted at each of the preset stop points and a template insertion key 24 extending from each of the front and the back surfaces that is inserted into a template key receiving socket 26 of the voice generating microprocessor controlled circuit 14 and which has a specific code hard wired within the key 24 such that the voice generating microprocessor controlled circuit 14 knows which template is positioned on the housing face 28 and which side of the template is facing the user.

Voice generating microprocessor controlled circuit 14 has a particular voice message for each stop location for each front and back surface of each template stored in memory 40 on the voice generating microprocessor controlled circuit 14 such that a correct spoken message is played on output speaker 46 describing the particular figure, event or location from the Bible that is pointed to by the pointer end 50 of the motor driven pointer 16 at the end of a rotating period started by depressing the start pointer button 54 and stopped by the extension of a stop rod 58 from a spinner stop solenoid 60 which is randomly activated by microprocessor controlled circuit 14.

One spinner 16 stops, voice generating microprocessor controlled circuit 14 generates the specific voice message signal corresponding to the template and the stop location to speaker 46 which outputs the spoken message to the user detailing who, what or where pointer 16 is pointing to as well as some biblical teaching to aid the user in remembering the particular biblical figure, event or location being pointed to by spinning pointer 16.

Putting on a new template requires pointer 16 to be detached from a shaft 65 by removing threaded pointer securing nut 69 from the threaded end of shaft 71, removing the current template 20, slipping the center hole 67 of the new template 20 over shaft 65 and securing pointer 16 back in place with threaded securing nut 71. The key 24 of the new template 20 is then inserted into the key receiving socket 26 so that the voice generating microprocessor controlled circuit 14 can determine which template 20 is in place and which surface of the template 20 is facing the user. It can be seen from the preceding description that a bible teaching aid has been provided. It is noted that the embodiment of the bible teaching aid described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A Bible figure, event, and location teaching aid comprising:

a housing containing a battery powered, voice generating microprocessor controlled circuit, having a motor driven pointer on the exterior thereof that randomly stops at one of a preset number of stop points, and a plurality of coded templates each having a front and back surface provided with a figure, event or location from the Bible depicted at each of the preset stop points and a template insertion key extending from each of the front and the back surfaces that is inserted into a template key receiving socket of the voice generating microprocessor controlled circuit and which has a specific code hard wired within the key such that the voice generating microprocessor controlled circuit knows which template is positioned on the housing face and which side of the template is facing the user;

the voice generating microprocessor controlled circuit having a particular voice message, for each stop location for each front and back surface of each template that is stored in memory on the voice generating microprocessor controlled circuit such that a correct spoken message is played describing the particular figure, event or location from the Bible that is pointed to by the pointer end of the motor driven pointer at the end of a rotating period started by depressing a start pointer button;

the voice generating microprocessor controlled circuit generating the specific voice message signal to a speaker which outputs the spoken message to the user detailing who, what or where is being pointed to and provides some biblical teaching to aid the user in remembering the particular biblical figure, event or location being pointed to by the pointer end of the spinning pointer.

* * * * *